United States Patent Office 2,695,847
Patented Nov. 30, 1954

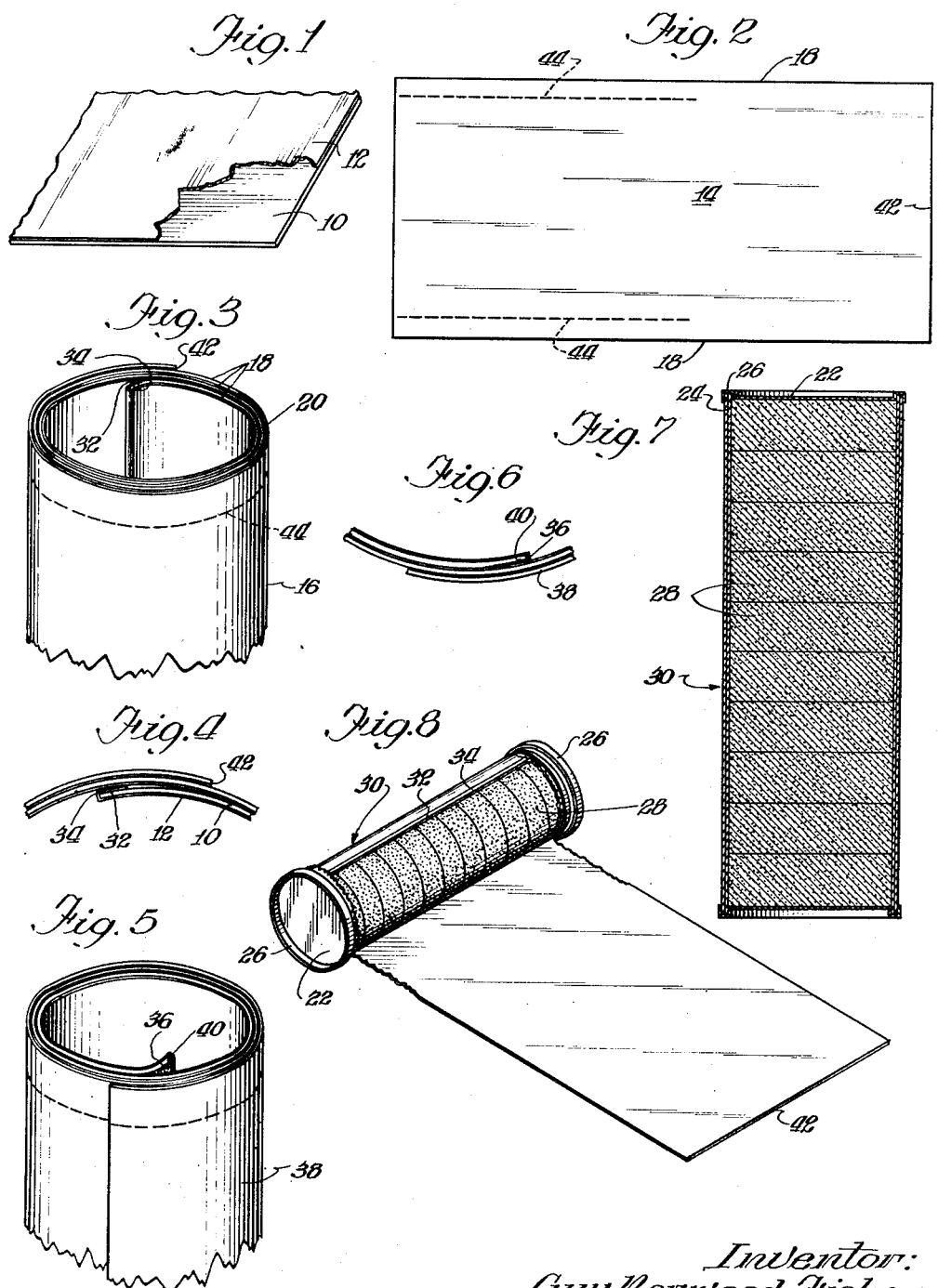

2,695,847

PACKAGE

Guy Norwood Fisher, Wilmette, Ill., assignor to Kraft Foods Company, Chicago, Ill., a corporation of Delaware Application March 10, 1951, Serial No. 214,935

6 Claims. (Cl. 99—172)

This application is a continuation-in-part of my prior pending application, Serial Number 126,801, filed November 12, 1949, now abandoned and the invention herein disclosed relates to packaged food products and especially to the packaging of expansible foods such as prepared bread or biscuit dough.

The increasing trend toward simplification of household chores has created a substantial market for prepared and packaged foods which is shared by leavened bread and biscuit dough. In one of its more popular forms, leavened dough is preshaped into disc-like cakes which are superposed in stacks for convenient packaging and distributed in a cylindrical container. The consumer merely removes the cakes from the container and places them in a hot oven to produce an edible biscuit, no particular effort or skill being required.

Under certain conditions, gases may be produced within the dough, during the interval between packaging and ultimate use, causing it to expand and to exert considerable pressure on the walls of the enclosing container. While it is relatively easy to fashion a container of sufficient strength to withstand this inner pressure, much difficulty has been encountered in attempting to provide a wholly satisfactory and convenient method for opening such a container. Under certain conditions, when the package is opened, the internal pressure created by these gases will extrude the dough through the opening, destroying, in the case of semi-prepared biscuits, the preformed biscuit shapes and necessitating re-shaping the dough into biscuit form. This re-working of the dough may release a portion of the gases already formed so that the finished biscuit may not be as light as would be desirable.

Accordingly, it is the principal object of this invention to provide a package which is strong enough to resist the inner pressure exerted by the dough but which may be readily opened in such a way that no subsequent re-shaping of the cakes is required.

Other objects and advantages will appear and the invention will be better understood from the accompanying drawing in which:

Figure 1 is a fragmentary perspective view, partially broken away, of the paperboard material from which the container is formed;

Figure 2 is a plan view of a paperboard blank from which the container may be formed;

Figure 3 is a fragmentary perspective view showing one end of a tube formed by coiling the blank illustrated in Figure 2 and illustrating one form of seal for the inner end of the paperboard blank;

Figure 4 is an enlarged fragmentary end view of the tube shown in Fig. 3;

Figure 5 is a fragmentary perspective view similar to Fig. 3, but illustrating another type of inner end seal for the paperboard blank;

Figure 6 is a fragmentary end view of the tube shown in Fig. 5;

Figure 7 is a sectional elevational view taken along a diameter of a completed package, showing the details of the end cap attachment; and Figure 8 is a perspective view of the package after it has been opened.

As will subsequently appear in complete detail, the package of the present invention includes a can-like container having cylindrical walls which are formed by tightly coiling a single sheet of paperboard. No form of interlaminar bond need be provided between the convolutions of the board, which are simply held in place by end caps crimped about the ends of the tube. As the prepared dough within the container expands, the laminar container walls are compressed, creating frictional forces between adjacent convolutions, which lock the convolutions against relative movement. This selflocking action prevents uncoiling of the paperboard sheet as the pressure within the container increases, and simultaneously seals the container. The outer convolution of the container wall is preferably scored near the ends of the container so that, in the hands of the consumer, the container may be easily opened by grasping the exposed end of the convoluted sheet and unwinding it from the body of the container. As the sheet is unwound, the unwinding process separates the intermediate portion of the paperboard blank from the margins which are still held by the end caps, and, as the last convolution is being unwound, the residual intact portion becomes too weak to sustain the internal pressure and breaks under the strain; thus the container is opened instantly along its entire length, thereby releasing the restraint on all the biscuits simultaneously.

In the embodiment of the invention illustrated in the drawings, the sheet material used for forming the walls of the container comprises a thin board 10 of paper having a protective coating 12 on one of its surfaces, as illustrated in Figure 1. Paperboard which is .009 inches thick and to which a layer of metal foil has been glued or otherwise bonded is a particularly suitable material. Other protective coatings might include some of the many plastic sheet materials already in use in the packaging of food, or might take the form of various resinous materials coated on, or impregnated into, the paperboard and cured.

This sheet material is formed into an oblong blank 14 of uniform width (Figure 2) which may be coiled upon a mandrel (not shown) in superposed convolutions with its coated side innermost, to form a laminated tube 16 (Figures 3 and 5). The tube is wound so that the convoluted side edges 18 of the sheet are respectively coplanar in order to provide a uniformly solid tube end 20 for the attachment of a closure member.

One end of the tube 16 is then closed with an end cap 22 which is desirably formed of a disc of sheet metal having a non-corrodible coating. An annular peripheral groove 24 is provided on the inner face of the end cap 22 to receive an end of the tube, the walls of the groove projecting outwardly from the outer face of the end cap to provide a chime 26 upon which to support the container. In attaching the end cap to the tube, the side walls of the groove are tightly crimped about the tube wall, thus securing the convoluted laminations in place to effect an open-ended can-like container.

A stack of preformed biscuits 28 having overall dimensions slightly less than the inner dimensions of the container is then inserted into the container. Adjacent surfaces of the biscuits may be coated with butter or vegetable oil, or some other separator may be provided to prevent adhesion of the biscuits and thus to aid in preserving the identity of the individual biscuits as the dough expands.

After the container thus formed has been charged with a stack of biscuits, the open end of the tube is closed with a similar end cap to form the completed package 30 shown in Figure 7. As leavening gases are generated, the dough enclosed within the container expands against the container walls, exerting pressure tending to uncoil the convoluted sheet. This uncoiling tendency is resisted initially by the end caps 22 with the result that the laminar walls of the container become tightly compressed, frictionally locking adjacent convolutions together to prevent relative sliding movement, and thereby simultaneously sealing the container. The self-locking nature of this construction produces an extremely strong container wall without the need for cementing the laminations together.

It will be appreciated that the biscuit dough contains a certain amount of moisture, a portion of which may be absorbed by the inner end 32 of the paperboard sheet 14, particularly after the dough has expanded into contact with the container walls. Unless some means is provided to prevent this loss of moisture, the portion of the biscuit dough which is adjacent the inner end of the paperboard sheet may be partially dehydrated. When this occurs, each of the biscuits may exhibit an undesirbale hard spot on one side when baked. It is, therefore, desirable to provide a moisture barrier between the biscuit dough and the end of the paperboard sheet.

In the construction illustrated in Figs. 3 and 4, this barrier takes the form of an extension 34 of the foil layer 12 beyond the inner end 32 of the paperboard blank. Prior to the formation of the tube 16 on a mandrel, the foil extension is folded back over the outside of the sheet to effectively seal the cut inner end 32 of the paperboard. In the event that it should be impractical to seal the inner end of the paperboard in this manner as, for example, should the foil-covered paperboard be supplied in rolls from which individual container-forming blanks are cut, a similar seal may be effected by covering the inner end of the blank with a separate strip of foil or other waterproof material in such manner that marginal portions of the sealing strip extend around the inner end of the paperboard to opposite sides of the board.

An alternative form of end seal is illustrated in Figs. 5 and 6. In this modification, a glue line 36 is applied to a coiled paperboard sheet 38 so that both the cut inner end 40 of the sheet and a narrow margin of the side of the sheet opposite the foil side are coated with glue. The type of glue used is one which, when set, will not absorb moisture from the biscuit dough. It may further be desirable to allow the glue to set before the sheet 38 is coiled so as to prevent substantial adhesion between the convolutions affected and thereby to prevent interference with partial uncoiling by which sealing is accomplished. The glue line which is applied, however, is preferably quite narrow so that the glue functions primarily to seal the pores of the paperboard sheet, rather than to join the inner end of the sheet to its adjacent convolution. Therefore, if a bond between lamination is incidentally effected, it will usually be insufficient to prevent the relative partial uncoiling by which the container is sealed.

As previously mentioned, the container is openable by grasping the exposed outer end 42 of the paperboard sheet and pulling it away from the body of the container. To facilitate opening, the outer layer or convolution of the sheet is preferably intermittently cut-scored as at 44 adjacent the ends of the container. The inner layer or convolution is preferably allowed to remain intact to enable the container to withstand the endwise pressure exerted by the expanding dough, and so that the container will be substantially gas-tight when the dough expands and compresses the laminar walls. The cut-scoring operation may be performed before the blank is coiled (Fig. 2) by scoring the blank adjacent its side edges 18 for a suitable distance from that end of the blank which is to become the outer end of the convoluted sheet, or alternatively, the cut-scoring may be performed after the paperboard blank has been coiled and before removal from the mandrel, suitable provision being made to permit the scoring tool to penetrate only the outer layer or convolution. In either case, the scoring cuts preferably do not extend completely through the paperboard.

When the outer end 42 of the sheet is pulled away from the body of the filled container, the portion of the sheet between the score lines 44 is uncoiled becoming severed from its side margins which are held by the end caps. Continued uncoiling produces tearing of the paperboard sheet along extensions of the score lines 44 and, as unwinding of the inner convolution begins, the container is no longer able to withstand the internal pressure of the dough. As a result, a seam is instantaneously opened along the entire length of the container, thus releasing the restraining pressure on all of the biscuits simultaneously. Further uncoiling permits removal of the biscuits without destroying their pre-cut disc-like shapes. Reworking of the dough is, therefore, obviated and the desired lightness of the final product is assured.

Although in the illustrated embodiment, the container tubes 16 and 38 are described as being fabricated from a single blank of sheet material pre-cut to final dimensions, it will be understood that the container tubes may be produced en masse by coiling an elongated tube from which individual container-forming sections may be severed.

Apart from its self-sealing and instantaneous and complete opening features, the novel package of the present invention has several other important advantages. The provision of an inner, protective liner, included as a constituent part of the wall-forming sheet, eliminates the need for an additional inner wrapper, as well as the expense attendant such a separate packaging operation. Moreover, the coated tube wall presents a smooth surface to which the enclosed dough will not adhere regardless of the amount of pressure developed within the container.

The present construction has a further advantage in that the printed matter applied to the usual paperboard container by means of a separate label may be printed directly upon the wall-forming paperboard sheet, thereby reducing further the cost of packaging.

While I have described my invention by reference to the embodiment illustrated in the drawings, it will be apparent to those skilled in the art that modifications thereof may be made without departing from the scope of the invention.

I claim:

1. A food package comprising a closed container and a quantity of expansible dough enclosed therein, said container comprising a tube formed from a single sheet of flexible paperboard material tightly coiled into a plurality of superposed convolutions which are readily separable from one another, and a pair of end caps each connected to an edge of said coiled sheet, said expansible dough pressing radially outwardly against the inwardly facing side of the innermost convolution thereby frictionally locking adjacent convolutions together thereby preventing relaitve sliding movement therebetween and sealing the container, said package being openable by uncoiling the convolutions of said tube by breaking the body of said sheet away from said end caps so that as the unwinding proceeds, the strength of the package is progressively reduced until said package opens along a line extending substantially the entire length of the container.

2. A food package comprising a closed container and a quantity of expansible dough enclosed therein, said container comprising a tube formed from a single sheet of flexible paperboard material tightly coiled into a plurality of superposed convolutions which are freely separable from one another, and a pair of end caps for closing the ends of said tube, each of said end caps having formed therein an annular groove to receive and hold an edge of said coiled sheet thereby to marginally connect said sheet to said end caps, said expansible dough pressing radially outwardly against the inwardly facing side of the innermost convolution thereby frictionally locking adjacent convolutions together thereby preventing relative sliding movement therebetween and sealing the container, said package being openable by uncoiling the convolutions of said tube by breaking the body of said sheet away from said end caps so that as the unwinding proceeds, the strength of the package is progressively reduced until said package opens along a line extending substantially the entire length of the container.

3. A food package comprising a closed container and a quantity of expansible dough enclosed therein, said container comprising a tube formed from a single sheet of flexible paperboard material tightly coiled into a plurality of superposed convolutions which are freely separable from one another, and a pair of end caps for closing the ends of said tube, each of said end caps having formed therein an annular groove to receive and hold an edge of said coiled sheet thereby to marginally connect said sheet to said end caps, said expansible dough pressing radially outwardly against the inwardly facing side of the innermost convolution thereby frictionally locking adjacent convolutions together thereby preventing relative sliding movement therebetween and sealing the container, the outer convolutions of said sheet being scored adjacent said edges inwardly of said end caps whereby said package is openable by uncoiling the convolutions of said tube by breaking the connections between the body of said sheet and said end caps along said scoring so that as the unwinding proceeds, the strength of the package is progressively reduced until said package opens along a line extending substantially the entire length of the container.

4. A food package comprising a closed container and a quantity of expansible dough enclosed therein, said container comprising a tube formed from a single sheet of flexible paperboard material tightly coiled into a plurality of superposed unbonded convolutions, and a pair of end caps for closing the ends of said tube, each of said end caps having formed therein an annular groove to receive and hold an edge of said coiled sheet thereby to marginally connect said sheet to said end caps, said expansible dough pressing radially outwardly against the inwardly facing side of the innermost convolution thereby frictionally locking adjacent convolutions together thereby preventing relative sliding movement therebetween and sealing the container, said sheet being scored adjacent said edges inwardly of said end caps but remaining imperforate in at least that portion thereof constituting the innermost convolution, said container being openable by uncoiling the convolutions of said tube from its outer end by breaking the connections between the body of said sheet and said end caps along said scoring so that as the unwinding proceeds, the strength of the package is progressively reduced until said package opens along a line extending substantially the entire length of the container.

5. A food package comprising a closed container and a quantity of expansible dough enclosed therein, said container comprising a tube formed from a single sheet of flexible paperboard material tightly coiled into a plurality of superposed unbonded convolutions, a moisture proof barrier completely covering the inner side of the innermost convolution and the inner end of said paperboard sheet, and a pair of end caps each connected to an edge of said coiled sheet, said expansible dough pressing radially outwardly against the inwardly facing side of the innermost convolution thereby frictionally locking adjacent convolutions together thereby preventing relative sliding movement therebetween and sealing the container, said sheet being scored adjacent said edges inwardly of said end caps but remaining imperforate in at least that portion thereof constituting the innermost convolution, said container being openable by uncoiling the convolutions of said tube from its outer end by breaking the connections between the body of said sheet and said end caps along said scoring so that as the unwinding proceeds, the strength of the package is progressively reduced until said package opens along a line extending substantially the entire length of the container.

6. A food package comprising a closed container and a quantity of expansible dough enclosed therein, said container comprising a tube formed from a single sheet of flexible paperboard material having a layer of metal foil on one side thereof and being coiled into a plurality of superposed unbonded convolutions with said foil side innermost and a pair of end caps each connected to an edge of said coiled sheet for closing the ends of said tube, said foil layer extending around the inner end of said sheet for a limited distance on the opposite side thereof to prevent absorption of moisture from the food material by said paperboard, said expansible dough pressing radially outwardly against the inwardly facing side of the innermost convolution thereby frictionally locking adjacent convolutions together thereby preventing relative sliding movement therebetween and sealing the container, said sheet being scored adjacent said edges inwardly of said caps but remaining imperforate in at least that portion thereof constituting the innermost convolution, said container being openable by uncoiling the convolutions of said sheet from its outer end by breaking the connections between the body of said sheet and said end caps along said scoring so that as the unwinding proceeds, the strength of the package is progressively reduced until said package opens along a line extending substantially the entire length of the container.

References Cited in the file of this patent

UNITED STATES PATENTS

| Number | Name | Date |
|---|---|---|
| Re. 18,426 | Willoughby | Apr. 19, 1932 |
| 1,571,089 | Carpenter | Jan. 26, 1926 |
| 1,862,301 | Drexler | June 7, 1932 |
| 1,873,716 | Nickerson | Aug. 23, 1932 |
| 1,904,741 | Lorber | Apr. 18, 1933 |
| 1,988,091 | Schumacher | Jan. 15, 1935 |
| 2,162,764 | Swan | June 20, 1939 |
| 2,185,469 | MacDonald | Jan. 2, 1940 |
| 2,275,157 | Morgan | Mar. 3, 1942 |
| 2,285,542 | Tasker | June 9, 1942 |
| 2,478,618 | Armstrong et al. | Aug. 9, 1949 |
| 2,490,133 | Inman | Dec. 6, 1949 |

OTHER REFERENCES

"Modern Packaging," July 1944, pages 105 to 108 and 146, article entitled Lamination by C. A. Southwick.